United States Patent [19]
Lucore et al.

[11] 3,791,670
[45] Feb. 12, 1974

[54] BAND BUCKLE FOR USE WITH INFLATABLE SEAT BELTS

[75] Inventors: Richard W. Lucore, Rochester; Robert L. Stephenson, Sterling Heights, both of Mich.

[73] Assignee: Allied Chemical Corporation, New York, N.Y.

[22] Filed: Sept. 21, 1972

[21] Appl. No.: 291,107

[52] U.S. Cl......... 280/150 AB, 285/137 R, 285/317
[51] Int. Cl............................................. B60r 21/08
[58] Field of Search .... 280/150 AB, 150 SB; 9/316; 24/230 A; 285/137 R, 317

[56] References Cited
UNITED STATES PATENTS

| | | | |
|---|---|---|---|
| 2,084,636 | 6/1937 | Fromm | 9/316 |
| 2,165,300 | 7/1939 | Peterson | 9/316 |
| 3,298,739 | 1/1967 | Scruggs | 297/389 |
| 3,414,326 | 12/1968 | Raffaelli | 280/150 SB |
| 3,430,979 | 3/1969 | Terry et al. | 280/150 AB |
| 3,544,063 | 12/1970 | Barlow | 285/137 R X |
| 3,682,498 | 8/1972 | Rutzki | 280/150 AB |
| 3,706,462 | 12/1972 | Lilly | 9/316 |
| 3,706,463 | 12/1972 | Lipkin | 280/150 AB |

Primary Examiner—Kenneth H. Betts
Attorney, Agent, or Firm—Jonathan Plaut; Roger H. Criss

[57] ABSTRACT

A seat belt buckle assembly is provided which comprises a tongue portion; a buckle portion adapted to lockably engage with the tongue portion; the tongue portion being connected to an inflatable seat belt; first chamber means provided in the buckle portion; second chamber means provided in the tongue portion and communicating with the inflatable seat belt; second chamber means being adapted to communicate with the first chamber means when tongue and buckle portions are lockably engaged; and inflating means communicating with the first chamber means, the inflating means including a gas source; whereby the inflating means and the inflatable seat belt are interconnected through the first and second chamber means when the tongue and buckle portions are lockably engaged so as to allow gas released from the gas source to pass through the first and second chamber means and inflate the inflatable seat belt.

15 Claims, 1 Drawing Figure

PATENTED FEB 12 1974　　3,791,670
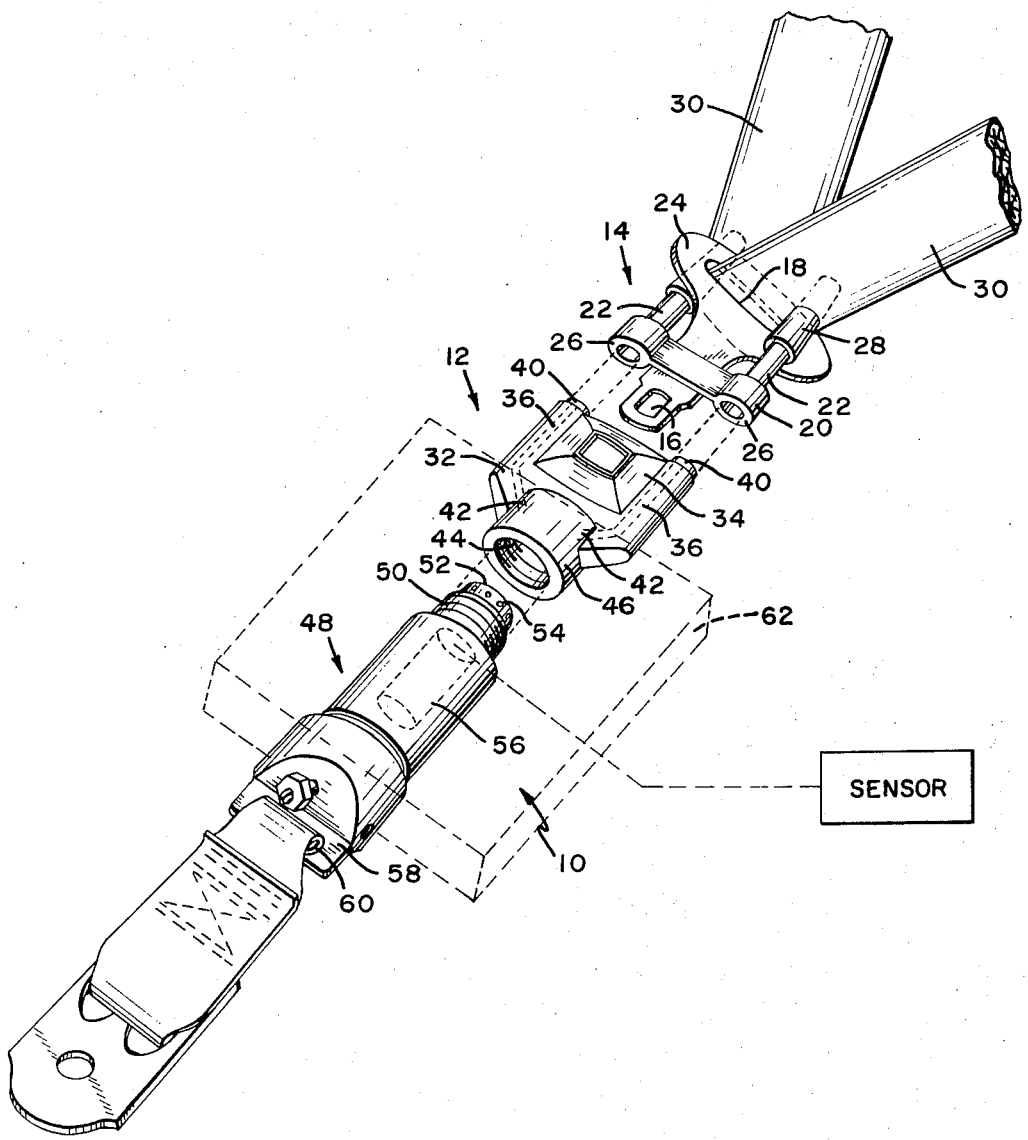

BAND BUCKLE FOR USE WITH INFLATABLE SEAT BELTS

FIELD OF THE INVENTION

This invention relates to seat belt buckles, particularly seat belt buckles adapted to be used with inflatable seat belts.

DESCRIPTION OF THE PRIOR ART

Inflatable seat belts have been proposed to provide more protection for occupants of vehicles than conventional seat belts. For example, as dislosed in U.S. Pat. application Ser. No. 290,917, filed Sept. 21, 1972, of Donald J. Lewis, entitled "Vehicle Safety System," it has been proposed to include a source of gas within an inflatable section of a tubular seat belt or attached to an inflatable section in order to inflate such section. As an example, it is proposed in said application to include a gas cartridge within a section of the seat belt adjacent to an attached tongue portion of a seat belt buckle assembly. To provide for automatic retraction of such a seat belt requires a retractor having a powerful spring as well as having a large area for storing the seat belt. Furthermore, electrical wiring is required within at least a portion of the seat belt to connect such cartridge to suitable sensing means which sense a preselected condition of the vehicle and actuates the cartridge to inflate the seat belt.

A combination inflatable seat belt-air bag device has been proposed in U.S. Pat. No. 3,682,498 to Rutzki. Such a device also may include a gas cartridge provided within the tubular seat belt. Similar problems of retracting a seat belt including an interiorly located gas cartridge and the presence of electrical wiring within the seat belt are attendant with the design of that patent.

SUMMARY OF THE INVENTION

In accordance with this invention, inflating means for an inflatable seat belt is provided to communicate with a buckle portion of a seat belt buckle assembly and the buckle portion is adapted to communicate with tongue portion of such assembly when the tongue and buckle portions are lockably engaged together, such that an inflating gas when released by the inflating means is introduced into the buckle portion and passes through the tongue portion into an inflatable seat belt which is connected to the tongue portion and is thereby inflated. In this manner, the inflating means may be connected to the buckle portion itself and communicates with the inflatable seat belt only when the tongue and buckle portions are lockably engaged together.

More particularly, in accordance with this invention, a seat belt buckle assembly is provided which comprises a tongue portion; a buckle portion adapted to lockably engage with the tongue portion; the tongue portion being connected to an inflatable seat belt; first chamber means provided in the buckle portion; second chamber means provided in th tongue portion and communicating with the inflatable seat belt; second chamber means being adapted to communicate with the first chamber means when tongue and buckle portions are locably engage, and inflating means communicating with the first chamber means, the inflating means including a gas source; whereby the inflating means and the inflatable seat belt are interconnected through the first and second chamber means when the tongue and buckle portions are lockably engaged so as to allow gas released from the gas source to pass through the first and second chamber means and inflate the inflatable seat belt.

BRIEF DESCRIPTION OF THE DRAWINGS

The sole FIGURE shows, in an exploded view, the seat belt buckle assembly of this invention in combination with a vehicle seat and a sensor, both shown in dotted lines.

DESCRIPTION OF THE PREFERRED EMBODIMENT

With reference to the drawing, there is shown a seat belt asembly 10 which includes a buckle portion 12 and a tongue portion 14 which are adapted to lockably engage with each other. The locking structure of buckle portion 12 and communicating tongue portion 14 may be of any suitable conventional design and since they are well known in the art, they are not specifically described herein. Generally, buckle portion 12 has a locking dog which is adapted to extend through aperture 16 in tongue portion 14 when the tongue and buckle portions are interfitted into locking enegagement. Buckle portion 12 is provided with suitable releasing mechanism which releases tongue portion 14 therefrom when it is desired to unbuckle the assembly. The releasing mechanism may be controlled through a push button, a lift lever or a slidable member or other means as is well known in the art. Because of its simplicity of design and compactness, a mini buckle described in U.S. Pat. No. 3,522,640 Lohr, is preferably utilized in this invnetion although other buckle assemblies may be employed.

Tongue portion 14 is adapted to be, and in use is, connected through suitable means (such as slot 18) to an inflatable seat belt of the type described in the aformentioned U.S. Pat. application of Donald J. Lewis, the disclosure of which is specifically incorporated herein. Such an inflatable seat belt generally includes an inflatable section which is in the form of a tube and normally maintained in an uninflated, folded condition by means of frangible fastening means which are adapted to break upon inflation of the inflatable section. As dislosed in said application, preferably the inflatable section is formed from a tubular sleeve of seat belt webbing material.

Tongue portion 14 is provided with chamber means which are adapted to communicate, preferably by a mechanical seal, with chamber means provided in buckle portion 12. For this purpose, tongue portion 14 is provided with second chamber means 20, which in essence provide a manifold system attached to or within tongue portion 14. As shown in the drawing, second chamber means 20 may include connectors 22 which are in the form of hollow tubes attached to the base portion 24 of tongue portion 14. Although two such connectors are shown in the drawings, which are preferred for reasons explained below, one such connector may alternatively be employed also for reasons which are explained below. The forward end 26 of connector 22 is adapted to interfit with the forward end of chamber means provided in the buckle portion as is more particularly set forth below. Th rearward end 28 of connector 22 is in sealed relation with inflatable seat belt 30.

Buckle portion 12 is provided with first chamber means 32 adapted to communicate with second chamber means 20 when buckle portion 12 and tongue portion 14 are locked together. First chamber means 32 in essence provide a manifold system in buckle portion 12. First chamber means 32 are shown as surrounding the perimeter of the locking portion 34 of buckle portion 12 although of course first chamber means 32 may be located elsewhere in buckle portion 12. First chamber means 32 preferably comprises hollow passageways 36 provided in lateral extensions 38 which surround locking portion 34. Two such passageways are shown in the drawing which communicate with the two connectors 22, although of course if only one connector 22 is provided, there need be only one passageway 36.

Forward ends 40 of passageways 36 are adapted to receive forward ends 26 of connectors 22 and thus may be formed with an internal diameter slightly larger than the external diameter of connectors 22. That is, forward ends 40 are designed as female sections and forward ends 26 as male sections. Of course, these functions could be reversed by providing tips connected to ends 40 which are adapted to be inserted within forward ends 26.

Passageways 35 communicate at their rearward ends 42 in a rear chamber 44 located in rearward portion 46 of buckle portion 12 which is adapted to receive inflating means 48. For this purpose, rearward portion 46 may be provided with internal threads or the equivalent.

When buckle assembly 10 is desired to be placed in locked position, tongue portion 14 is inserted into buckle portion 12 and the later's locking mechanism locably engages with aperture 16 or equivalent structure. At the same time, connectors 22 are inserted into passageways 36. As a result, a continuous path is provided from rear chamber 44 to rearward ends 28 of connectors 22.

Inflating means 48 is provided with a projecting portion 50 which is threaded or otherwise adapted to be connected to rearward portion 46. The connection between projecting portion 50 and rearward portion 46 is desirably of high strength since buckle portion 12 is mounted to the vehicle through inflating means 48 as is described below. Forward end 52 of projecting portion 50 may be provided with a series of apertures 54 which communicate with rear chamber 44 when projecting portion 50 and rearward portion 46 are connected.

Inflating means 48 includes a gas source, such as gas cartridge 56 which may be of the stored gas type, the generated gas type or a hybrid type (combination of stored and generated gas). Such gas sources are known in the art and have been suggested for use with proposed air bag restraint systems; accordingly, they are not specifically described herein.

Inflating means 48 is designed to release gas into rear chamber 44 upon the occurrence of a preselected condition of the vehicle, such as a collision or rapid deceleration. For this purpose, inflating means 48 may include a valve or the like which is opened in response to a signal from a sensing means, indicated diagrammatically in the drawing as a sensor, which senses such preselected condition. When the valve is opened, gas from cartridge 56 is introduced into rear chamber 44 through apertures 54. If a stored gas source is utilized, pressurized gas is thus released into rear chamber 44.

If a generated gas source is utilized, generated gas is thus introduced into rear chamber 44 and similarly if a hybrid gas source is used, both generated and pressurized gas is so introduced. When the gas source is of the generated type (that is, is generated by a pyrotechnic device, etc.), suitable electrical connections are provided between the sensing means and a detonating device for the pyrotechnic.

Rear portion 58 of inflating means 48 is provided with a coupling means, such as a slot 60, which is designed to connect with a section of seat belt webbing, cable or the like which in turn is mounted to the vehicle, preferably the vehicle floor, in a manner well known in the art.

As previously mentioned, rearward end 28 of connectors 22 are in sealed connection with inflatable seat belt 30. This may be achieved by providing one end of belt 30 about rearward end 28, with a suitable clamping means forming and retaining the sealed connection.

It is preferred that two inflatable seat belts 30 be provided for fastening about the lap and shoulder portions of the wearer. For this purpose, separate inflatable lap and seat belts 30 each with its own inflatable section are provided. One end of each of the inflatable lap and shoulder belts are connected to rearward end 28 of connectors 22 in a manner described above. The other end of the lap and shoulder belts are connected to conventional seat belt system parts, such as retractors mounted on the floor for the lap belt and on the ceiling or side wall for the shoulder belt. Obviously, retractors are not required although they are preferred. Retractors are preferably of the automatic locking type or inertia type.

The total seat belt system desirably is a three-point system including separate inflatable lap and shoulder belts attached at separate points to the vehicle and also attached at one common point to a tongue portion of a buckle assembly which is designed to lock with a buckle portion thereof. However, the buckle assembly of this invention can be used with other systems. For example, a single continuous inflatable belt may be provided which fastens about both the lap and shoulder portions of the wearer. In this case, a single connector 22 need be provided to inflate the belt at one location although of course such a belt may be inflated at two locations utilizing the structure shown in the drawing.

Moreover, in the case where only one seat belt is desired to be fastened about the wearer (either a lap or shoulder belt or a belt which goes under the armpits of the wearer), a single connector 22 need only be provided. Furthermore, in some instances it may be desired to attach separate lap and shoulder belts to separate buckles, in which also only one connector 22 need be provided.

When only one connector 22 is required, as in the instances mentioned above, the buckle assembly is modified in that only one passageway 36 need be provided to communicate with the single connector. In addition, in an alternate embodiment one passageway 36 may be provided which communicates with a single connector 22, which connector is split into two chambers at its rearward end to be attached to two seat belts.

In operation of the preferred embodiment of this invention, a wearer places inflatable lap and shoulder belts about his body and inserts tongue portion 14 into buckle portion 12 to lock the same together. At the same time forward ends 26 of connectors 22 are inserted into passageways 36. The buckle assembly is now in operable condition to allow the inflatable belts to inflate upon the occurrence of the preselected condition which the sensor senses. When such condition occurs, the sensor signals inflating means 48 which thereupon introduces a gas (preferably a pressurized gas stored in cartridge 46) through apertures 54 into rear chamber 44 and through passageways 36. The gas then passes from buckle portion 12 to tongue portion 14 through connectors 22 and thence out the rearward ends of such connectors and is introduced into the inflatable belts, as a result of which such belts are inflated. The total time from sensing the condition to inflation of the belts can be of a very short order utilizing the present system, such as within about 5 to 10 milliseconds.

Buckle portion 12 can be positioned at any desired location in the vehicle. For example, buckle portion 12 can extend through a vehicle seat, shown in dotted lines as 62, such that only the front portion thereof (front ends 40 of passageways 36 and the front portion of locking portion 34) is exposed. In such instance, the vehicle seat may be cut out to provide for positioning of the buckle portion therethorugh. In this manner, the major portion of buckle portion 12 is unexposed and the vehicle seat is not cluttered by seat belt mechanisms. Tongue portion 14 is preferably suitably retracted to a stored condition at the side of the vehicle seat, such as along the side wall of the vehicle.

By providing the entry of gas through the buckle portion itself, it is possible to provide inflatable seat belts which are readily retractible and which do not require any electrical wiring or gas cartridge therein. Furthermor, by locating the buckle portion behind, under or in the seat in its unexposed location, noise incident to detonation of and/or escaping of gas from the gas source can be effectively muffled with respect to the wearer.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

We claim:

1. A seat belt buckle assembly comprising
   a tongue portion;
   a buckle portion adapted to lockably engage with said tongue portion;
   said tongue portion being connected to an inflatable seat belt;
   said buckle portion being provided with first chamber means;
   said tongue portion being provided with second chamber means;
   said second chamber means communicating with said inflatable seat belt;
   said second chamber means being adapted to communicate with said first chamber means when said tongue and buckle portions are lockably engaged;
   inflating means communicating with said first chamber means;
   said inflating means including a gas source whereby said inflating means and said inflatable seat belt are interconnected through said first and second chamber means when said tongue and buckle portions are lockably engaged so as to allow gas released from said gas source to pass through said first and second chamber means and inflate said inflatable seat belt.

2. A buckle assembly in accordance with claim 1 wherein said tongue portion is connected to inflatable lap and shoulder belts and said second chamber means communicates with said inflatable lap and shoulder belts.

3. A buckle assembly in accordance with claim 1 wherein said tongue portion is connected to a single inflatable seat belt.

4. A buckle assembly in accordance with claim 1 wherein said first chamber means comprises internal passageways located in said buckle portion and said second chamber means comprises hollow connecting portions adapted to interfit with said internal passageways.

5. A buckle assembly in accordance with claim 4 wherein said buckle portion includes a locking portion thereof and said first chamber means comprises two internal passageways peripherally located about the sides of said locking portion.

6. A buckle assembly in accordance with claim 5 wherein said tongue portion includes a locking portion adapted to lock with said portion of said buckle portion and said second chamber means comprises two connecting portions spaced laterally of said locking portion of said tongue portion.

7. A buckle assembly in accordance with claim 5 wherein said internal passageways communicate with each other adjacent the location whereat said first chamber means communicates with said inflating means.

8. A buckle assembly in accordance with claim 4 wherein said first chamber means includes a single internal passageway and said second chamber means includes a single connecting portion.

9. A buckle assembly in accordance with claim 1 wherein said gas source comprises a cartridge of stored gas.

10. A buckle assembly in accordance with claim 1 wherein said gas source comprises a cartridge comprising gas generating materials.

11. A buckle assembly in accordance with claim 1 wherein said gas source comprises a cartridge of stored and generated gas.

12. A buckle assembly in accordance with claim 1 wherein said inflating means is adapted to mechanically interfit with said buckle portion.

13. A buckle assembly in accordance with claim 12 wherein said inflating means is mounted on the floor of a vehicle.

14. A buckle assembly in accordance with claim 1 wherein said buckle portion is located within a portion of a vehicle seat.

15. A buckle assembly in accordance with claim 1 wherein said inflating means is actuated in response to a sensor which senses a preselected condition of a vehicle and upon being actuated said inflating means releases gas from said gas source into said buckle portion and said gas passes through said first and second chamber means and is introduced into said inflatable seat belt to inflate the same.

* * * * *

PO-1050
(5/69)

UNITED STATES PATENT OFFICE
CERTIFICATE OF CORRECTION

Patent No. 3,791,670          Dated February 12, 1974

Inventor(s) Richard W. Lucore and Robert L. Stephenson

It is certified that error appears in the above-identified patent and that said Letters Patent are hereby corrected as shown below:

The title should read -- SEAT BELT BUCKLE FOR USE WITH INFLATABLE BANDS --
Column 1, line 13, "dislosed" should read -- disclosed --;
          line 60, "th" should read -- the --.
Column 2, line 33, before "Lohr" insert -- to --;
          line 34, "invnetion" should read -- invention --;
          line 59, "drawings" should read -- drawing --;
          line 66, "Th" should read -- The --.
Column 3, line 25, "35" should read -- 36 --;
          line 33, "later's" should read -- latter's --;
          line 34, "locably" should read -- lockably --.
Column 5, line 24, "therethorugh" should read -- therethrough --;
          line 34, "mor" should read -- more --.
Column 6, line 27, after "said", first occurrence, insert -- locking --.

Signed and sealed this 9th day of July 1974.

(SEAL)
Attest:

McCOY M. GIBSON, JR.
Attesting Officer

C. MARSHALL DANN
Commissioner of Patents